(12) United States Patent
Weigand et al.

(10) Patent No.: US 6,601,738 B2
(45) Date of Patent: Aug. 5, 2003

(54) LUBRICANT DISPENSER

(75) Inventors: Michael Weigand, Elfershausen (DE); Armin Brand, Bad Kissingen (DE); Bernd Scheit, Bad Bocklet-Aschach (DE); Thomas Hildenbrand, Bad Brückenau (DE)

(73) Assignee: perma-tec GmbH & Co. KG, Euerdorf (DE)

( * ) Notice: Subject to any disclaimer, the term of this patent is extended or adjusted under 35 U.S.C. 154(b) by 73 days.

(21) Appl. No.: 09/982,187

(22) Filed: Oct. 18, 2001

(65) Prior Publication Data

US 2002/0079336 A1 Jun. 27, 2002

(30) Foreign Application Priority Data

Dec. 7, 2000 (EP) .............................. 00126808

(51) Int. Cl.⁷ ..................... B65D 88/54; G01F 11/06; G01F 11/30; G01F 11/36; G01F 11/42
(52) U.S. Cl. ................. 222/286; 222/63; 222/282; 222/333; 222/387; 222/390; 184/37; 184/38.4; 417/411
(58) Field of Search ............... 184/37, 38.4, 105.1, 184/105.2; 222/52, 61, 63, 64, 251, 282, 285, 286, 333, 386, 387, 390; 417/411, 415

(56) References Cited

U.S. PATENT DOCUMENTS

| | | | | |
|---|---|---|---|---|
| 4,653,675 A | * | 3/1987 | Ratzky | ........................ 222/390 |
| 4,793,524 A | * | 12/1988 | Starr | ........................ 222/309 |
| 5,022,556 A | * | 6/1991 | Dency et al. | ................... 222/1 |
| 5,271,528 A | * | 12/1993 | Chien | .......................... 222/63 |
| 5,971,229 A | * | 10/1999 | May et al. | ................... 222/390 |
| 6,354,816 B1 | * | 3/2002 | Yang | ........................... 417/411 |
| 6,408,985 B1 | * | 6/2002 | Orlitzky et al. | ............... 184/37 |

FOREIGN PATENT DOCUMENTS

| | | | |
|---|---|---|---|
| DE | 29902553 | * | 5/1999 |
| EP | 0 845 631 | | 11/1997 |

* cited by examiner

Primary Examiner—Timothy L. Maust
(74) Attorney, Agent, or Firm—Collard & Roe, P.C.

(57) ABSTRACT

A lubricant dispenser comprising a housing, a lubricant supply container, a plunger, a telescopic hollow spindle, and an electromechanical servo-drive for changing the length of the telescopic hollow spindle. One end of the telescopic hollow spindle is fixed on the housing. With its other end, the telescopic hollow spindle cooperates with a plunger containing a passage opening for lubricant. The telescopic hollow spindle has a lubricant passage channel in which at least one check valve is arranged on the inlet side. The telescopic hollow spindle alternately carries out setting strokes of different lengths that increase or reduce the length of the spindle. The setting strokes are coordinated with each other so that with a setting stroke of the telescopic hollow spindle increasing the length of the spindle, a preset amount of lubricant displaced by the movement of the plunger enters the lubricant passage channel through the opening check valve.

13 Claims, 4 Drawing Sheets

LUBRICANT DISPENSER

BACKGROUND OF THE INVENTION

1. Field of the Invention

The invention relates to a lubricant dispenser comprising a housing, a lubricant supply container with a plunger connected with the housing, and an electromechanical drive.

2. The Prior Art

In an embodiment known from EP-A 0 845 631, the electromechanical drive comprises a spindle which is driven by a gear drive motor. The lubricant supply container has an outlet opening for lubricant, which is squeezed out by a movement of the plunger. The build-up of pressure in the lubricant supply container is limited. If large resistance to flow builds up on the outlet opening or in a line adjoining the opening; an overload protection device responds, which switches off the electromechanical drive; and the supply of the various lubrication points when lubricant is not assured. Furthermore, with dispensers known in the art, the lubricant supply container has to be exchanged. Line systems arranged downstream have to be detached from the lubricant supply container. If the electromechanical drive has an external power source and/or the lubricant dispenser is connected to a central control, electrical plug connections have to be pulled from the housing before the housing containing the electromechanical drive can be unscrewed from the lubricant supply container.

Furthermore, lubricant dispensers are known in the art, which comprise a lubricant supply container that is connected with the housing in a detachable manner. On the suction side of the plunger pump, a channel fixed on the housing adjoins the housing and feeds into the lubricant supply container. The housing accommodates the plunger pump, a control device, and possibly batteries for supplying the plunger pump with current. The housing also has an outlet channel that is connected with the pressure side of the plunger pump. The lubricant supply container contains a spring-loaded plunger which puts the lubricant supply under pressure and feeds the lubricant. This lubricant is highly viscous in most cases, such as grease, and feeds into the plunger pump on the suction side. Constantly admitting pressure to the lubricant supply poses the risk that the lubricant dispenser bleeds out, wherein small amounts of lubricant are constantly pressed out by the piston when pressure is applied. Furthermore, the plunger pump represents an aggregate that is relatively expensive.

SUMMARY OF THE INVENTION

The invention relates to an electromechanically operated lubricant dispenser that is simple in design and permits exactly metered dispensing of lubricant at high squeeze-out pressure. The supply of lubricant is not acted upon by a pressure spring-loaded plunger to avoid the risk of bleed-out.

The object of the invention is to provide a lubricant dispenser comprising a housing, a lubricant supply container with a plunger connected with the housing, a telescopic hollow spindle, and an electromechanical servo-drive for changing the length of the telescopic hollow spindle.

The telescopic hollow spindle is fixed on one end, of the housing. This hollow spindle has a lubricant passage channel, and cooperates on the other side with a plunger containing a passage opening for lubricant.

There is also at least one check valve that is arranged in the lubricant passage channel on the inlet side.

The telescopic hollow spindle alternately carries out setting strokes of different lengths that increase or shorten the length of the telescopic spindle.

The setting strokes are coordinated with each other wherein the telescopic hollow spindle moves through a setting stroke which increases the length of the spindle. A plunger moves to displace a preset amount of lubricant so that it enters the lubricant passage channel through the opening check valve. With a subsequent setting stroke reducing the length of the spindle, the preset amount of lubricant is squeezed out of the lubricant passage channel by the action of the closed check valve on the inlet side. In a preferred embodiment of the invention, the plunger is supported in the lubricant supply container with friction and torsional strength, by means of elastomer seals arranged on the periphery, and does not carry out any resetting movements.

With a setting stroke increasing the length of the spindle, the telescopic hollow spindle is driven against the plunger and presses the plunger forwards by a preset measure $\Delta x$. Thus, the lubricant is displaced and enters the lubricant passage channel of the telescopic hollow spindle through the opening check valve. With the subsequent setting stroke shortening the length of the spindle, the amount of lubricant previously supplied to the lubricant passage channel is squeezed out of the lubricant passage channel by contraction of the telescopic hollow spindle. The setting stroke of the telescopic hollow spindle increasing its length is by the measure $\Delta x$ greater than the subsequent setting stroke reducing the length. The setting strokes are coupled kinematically, so that they can be precisely coordinated.

In a preferred embodiment of the invention, the telescopic hollow spindle comprises a tube arranged in a fixed manner on the housing, and a hollow spindle with an outer thread that is movably arranged on the tube and capable of sliding on the tube. A driving gear with an inside thread is arranged on the hollow spindle and rotatably supported in the housing with axial strength and driven by a pinion of the servo-drive. Gaskets, for example in the form of elastomer sealing rings are arranged between the tube and the hollow spindle. Furthermore, a second check valve should be arranged at the end of the lubricant passage channel on the outlet side.

Various possibilities are available for the constructional design of the servo-drive. According to a preferred embodiment, the servo-drive comprises a motor that is operated by a control in an alternating manner wherein it is capable of turning both in the right and left directions of rotation. Moreover, a geared motor can be used that comprises a reversing device for reversing the direction of rotation of the driving shaft. Furthermore, it is possible to associate two motors with the hollow spindle that have different directions of rotation and are controlled in an alternating manner.

As another development of the invention, the servo-drive has an electronic control with a sensor for picking up the measured value, which counts the number of the revolutions of the motor or of a pinion driven directly or indirectly by the motor. The electronic control then stops the electric motor after a preset number of revolutions. In addition, different values that are coordinated with the setting strokes of the telescopic hollow spindle are preset for the setting stroke increasing or reducing the length of the telescopic hollow spindle.

The plunger may comprise a pin having a passage opening. The end of the telescopic hollow spindle located on the plunger side is pushed onto the pin, whereby there is a seal arranged between the pin and the telescopic hollow spindle. In a preferred embodiment of the invention, the telescopic hollow spindle has a collar surface which impacts the plunger with a setting stroke increasing its length. Furthermore, the telescopic hollow spindle has an extension which is axially movably extended through the passage opening of the plunger and projects into the space of the lubricant supply container filled with lubricant. The plunger has a short outlet tube containing the passage opening, whereby there is a seal between the short outlet tube and the telescopic hollow spindle.

The lubricant supply container can be connected in a detachable manner with the housing. The housing can contain the servo-drive, the electronic control associated with the servo-drive, and the part of the telescopic hollow spindle that is fixed on the housing. The connection end of the telescopic hollow spindle that is movable in the longitudinal direction projects beyond one face side of the housing. The plunger is supported on the lubricant supply container with friction and with torsional strength. This plunger does not perform any resetting movements. When the plunger impacts the face of the lubricant supply container, the servo-drive is supplied with a return pulse by the associated electronic control. Next, the telescopic hollow spindle is driven back into a starting position. Because a short lubricant outlet tube is not arranged on the lubricant supply container and there are no lines for data transmission or power supply connected to the lubricant supply container, it is very simple and easy to replace the lubricant supply container.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
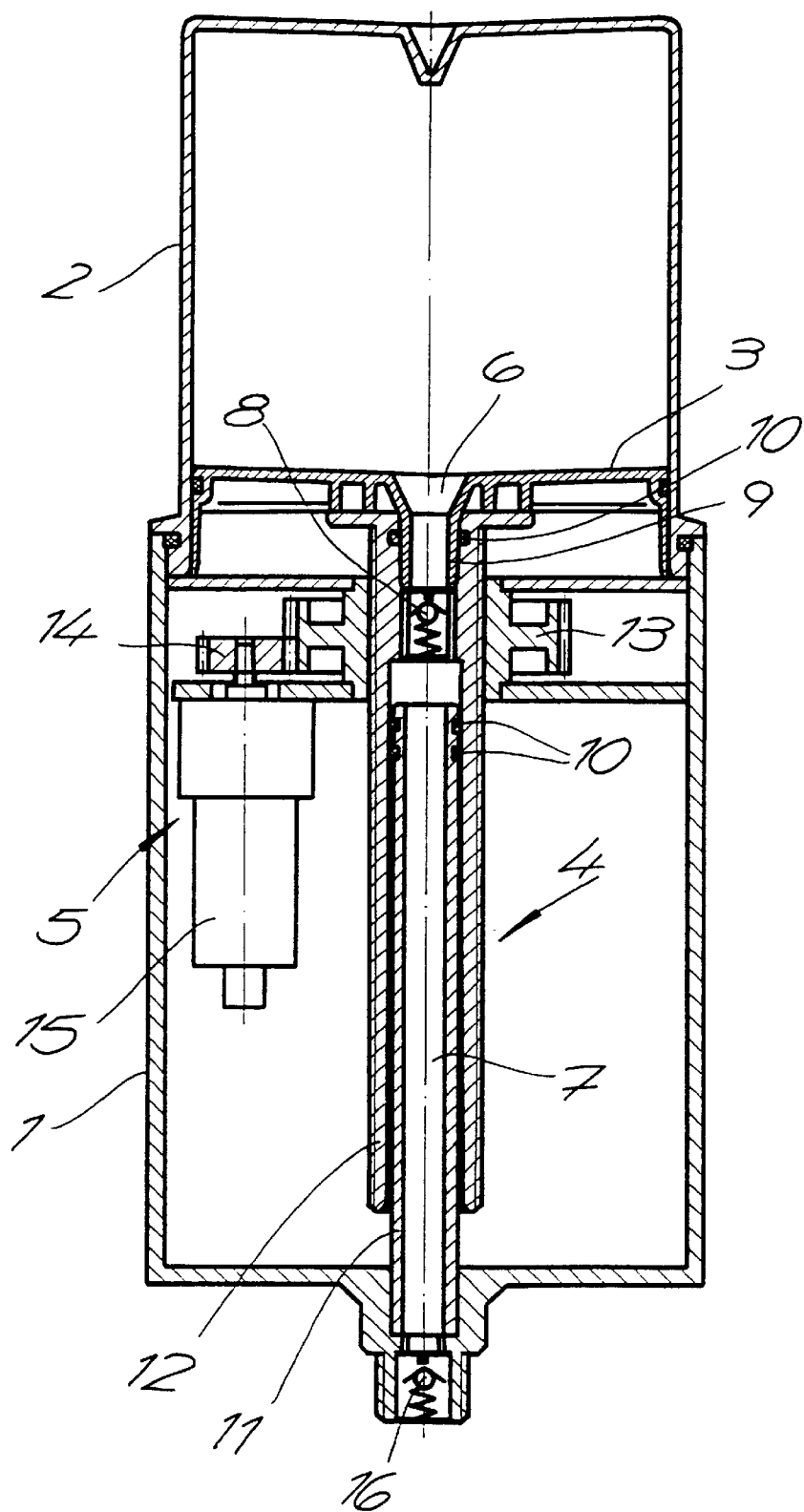
FIG. 1 shows a longitudinal cross section of the device in a first position.
Figure 2:
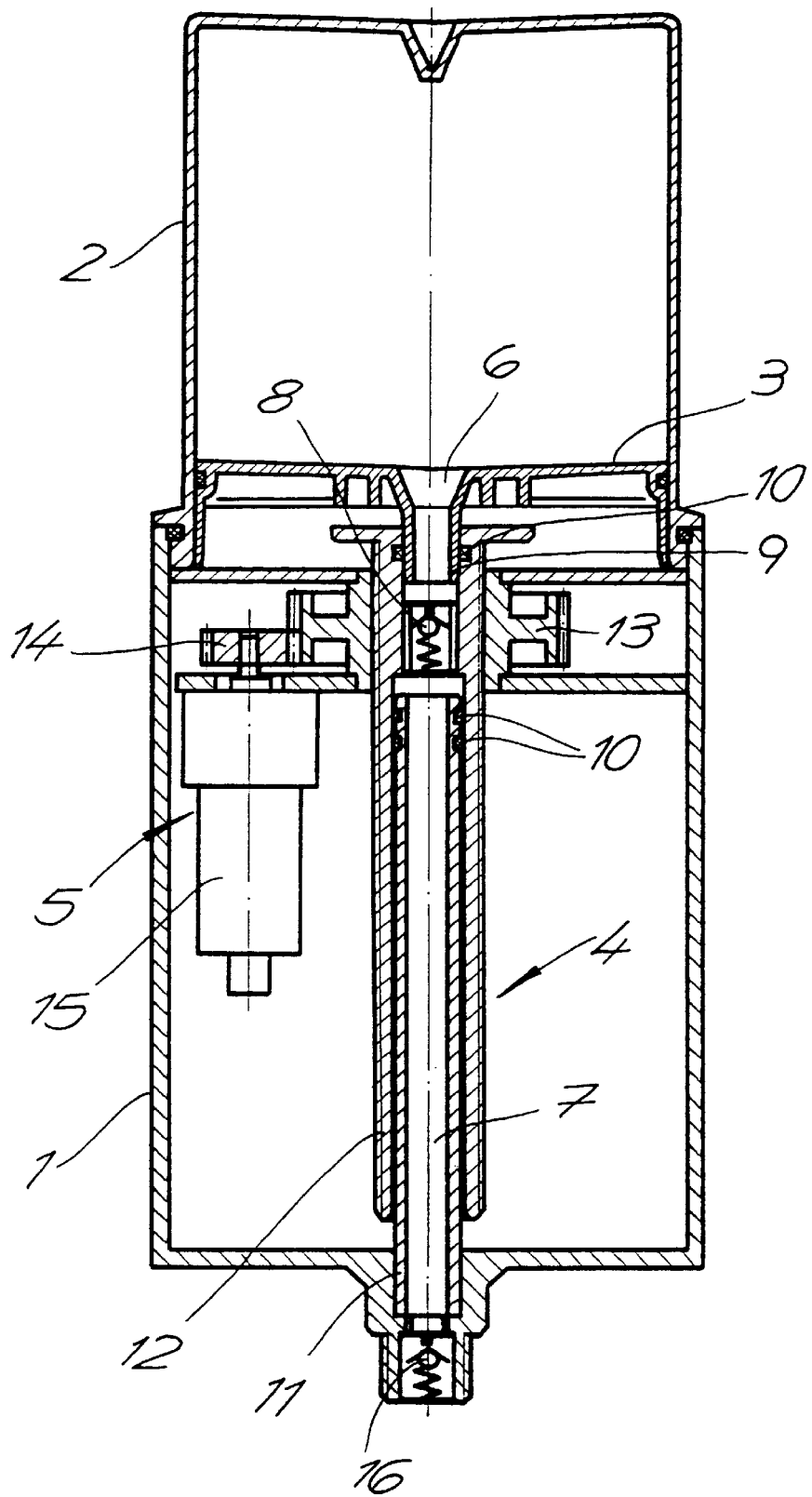
FIG. 2 shows a longitudinal cross-section of the device in a second position.

Referring to the drawings, FIG. 1 shows the lubricant dispenser as defined by the invention comprises a housing 1, a lubricant supply container 2 connected with the housing 1, a plunger 3 disposed within the lubricant supply container 2, a telescopic hollow spindle 4, and an electro-mechanical servo-drive 5 for changing the length of the telescopic hollow spindle 4. One end of telescopic hollow spindle 4 is arranged in a fixed manner on housing 1 and, with its other end, rests on plunger 3 at least in the functional position shown in FIG. 1. Furthermore, telescopic hollow spindle 4 has a lubricant passage channel 7 adjoining a passage opening 6 of plunger 3. There is at least one check valve 8 arranged in the lubricant passage channel 7 on the inlet side. Telescopic hollow spindle 4 alternately carries out setting strokes of different lengths which increase or reduce the length of the stroke. The function of these strokes is clearly shown in FIGS. 1 and 2 by a comparative view. With a setting stroke increasing the length, which is shown in FIG. 1, an amount of lubricant is displaced from the lubricant supply container 2 by the movement of the plunger. This amount of lubricant enters the lubricant passage channel 7 through the opening check valve 8. With the subsequent setting stroke, which is shown in FIG. 2 and reduces the length of the setting stroke, this amount of lubricant is squeezed out of the lubricant passage channel 7 by the action of closed check valve 8 on the inlet side. Plunger 3 has a pin 9 located on the underside of plunger 3 and which also has passage opening 6. The end of telescopic hollow spindle 4 located on the side of plunger 3 is pushed over pin 9 and is axially movable on pin 9.

A seal 10 is arranged between pin 9 and telescopic hollow spindle 4. Plunger 3 is retained via friction in lubricant supply container 2 and does not carry out any resetting movements.

A comparative look at the figures shows that telescopic hollow spindle 4 comprises a tube 11, which is arranged in the housing in a fixed manner, and a hollow spindle 12 with an outer thread slidably arranged on tube 11. Seals 10 are located between tube 11 and hollow spindle 12. A driving gear 13 with an inside thread is mounted on hollow spindle 12. This driving gear 3 is rotatably supported with axial strength in housing 1 and driven by a pinion 14 of the servo-drive 5. Servo-drive 5 has a dc motor 15, which is operated by a control and alternately rotates in the right and left directions of rotation. Motor 15 may be supplied with current externally or by batteries inserted in the housing 1. Furthermore, servo-drive 5 comprises an electronic control which is equipped with a rotational speed sensor. The rpm sensor counts the number of revolutions of the motor or a pinion which is directly or indirectly driven by the motor. After a preset number of revolutions, motor 15 is stopped by the electronic control, whereby different values, which are coordinated with the setting strokes of the telescopic hollow spindle 4, are preset for the setting stroke increasing the length and the setting stroke reducing the length of the telescopic spindle.

Lubricant supply container 2 is detachably connected with housing 1. Servo-drive 5 has an associated electronic control and a part 11 of the telescopic hollow spindle 4 that is arranged fixed on housing 1. The longitudinally movable connection end 12 of telescopic hollow spindle 4 projects from one face of housing 1 on the outer side. After lubricant supply container 2 has been emptied, it is replaced by a new container filled with a fresh supply of lubricant.

Figure 3:
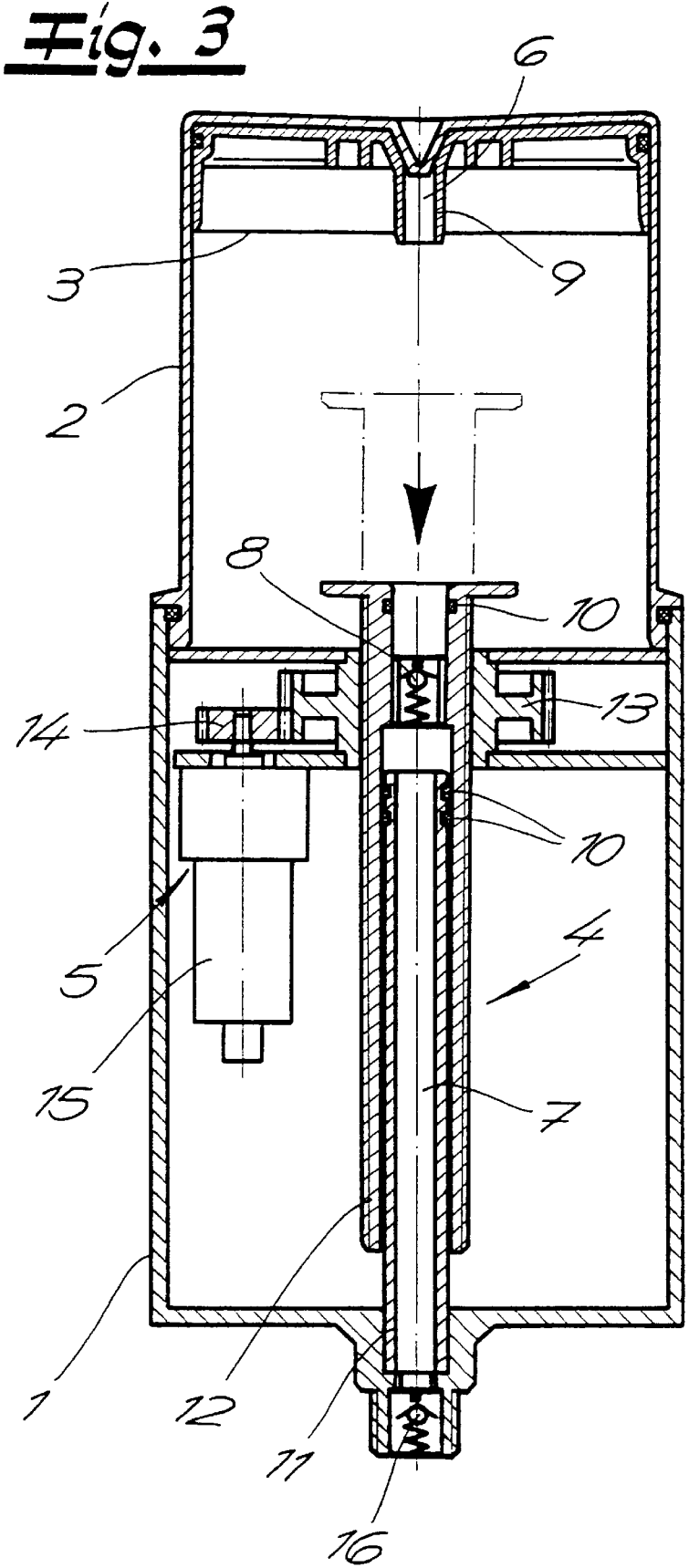
FIG. 3 shows a longitudinal cross-section of the device in a third position.

When, after lubricant supply container 2 has been emptied, plunger 3 impacts the face of lubricant supply container 2. At this point the electronic control supplies servo-drive 5 with a return pulse. In addition, telescopic hollow spindle 4 is driven back into the starting position shown in FIG. 3. When this occurs, a portion of the lubricant still contained in lubricant passage channel 7 is squeezed out of the channel via the outlet of the housing 1 located on the bottom side by means of contraction of the telescopic hollow spindle 4. This process is shown in FIG. 3, whereby the resetting movement of the telescopic hollow spindle 4 is indicated by a directional arrow.

The figures show that a second check valve 16 is arranged at the end of lubricant passage channel 2 on the outlet side. This second check valve may be arranged in tube 11 of the telescopic hollow spindle 4, wherein the tube is fixed on housing 1, or in a valve receptacle of housing 1 as shown in the figures.

Figure 4:
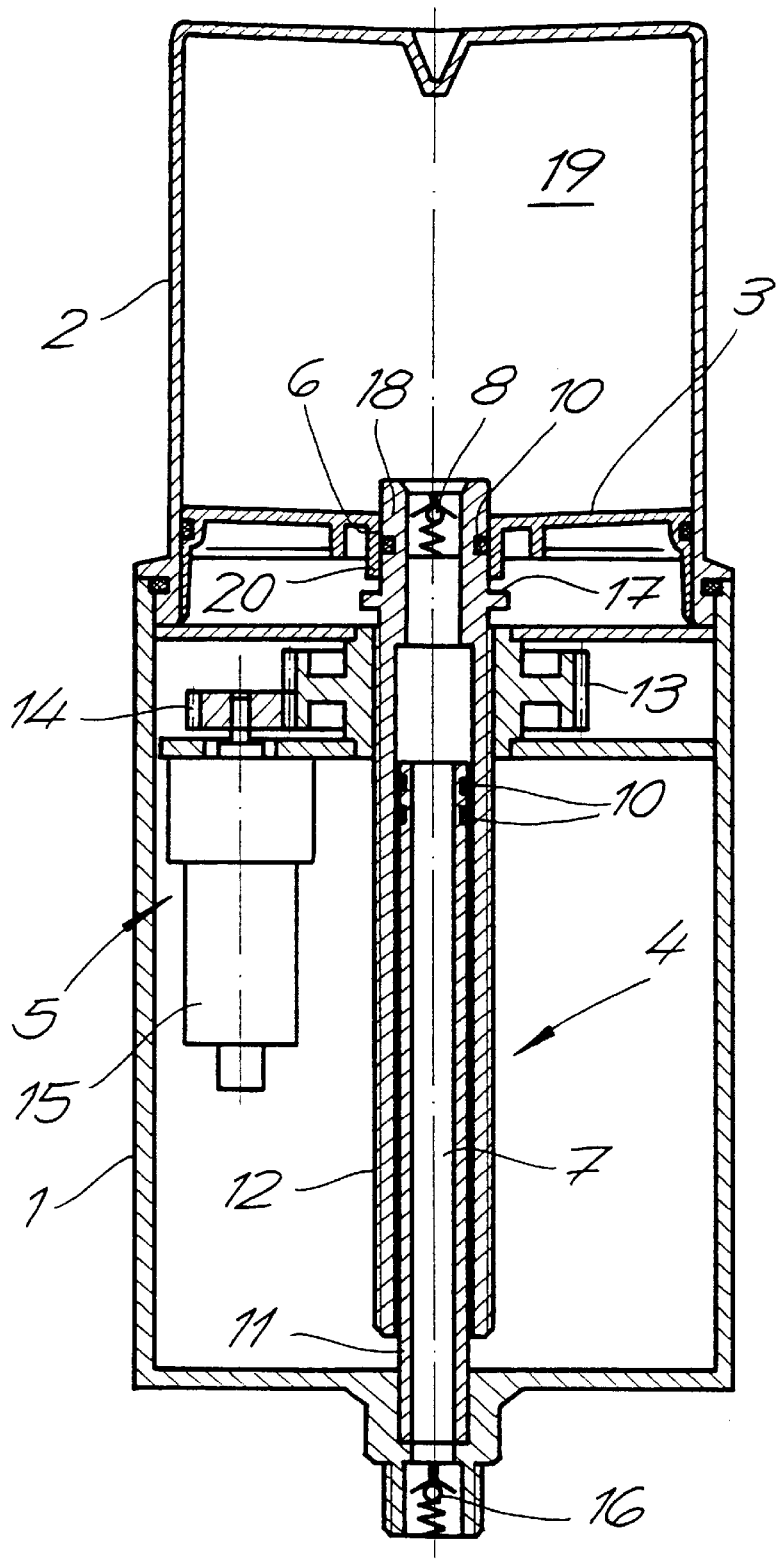
FIG. 4 shows a longitudinal cross-section of the second embodiment of the device.

In the lubricant dispenser as shown in FIG. 4, Telescopic hollow spindle 4 has a collar surface 17 which impacts plunger 3 during a setting stroke which increases the length. An extension 18 of telescopic hollow spindle 4 is guided axially movably through passage opening 6 of the plunger and projects into space 19 of lubricant supply container 2 filled with lubricant. The plunger has a short outlet tube 20 containing passage opening 6. A gasket 10 is arranged between short outlet tube 20 and telescopic hollow spindle 4.

Accordingly, while at least one embodiment of the present invention has been shown and described, it is obvious that many changes and modifications may be made thereunto without departing from the spirit and scope of the invention.

What is claimed is:

1. A lubricant dispenser comprising:
   a) a housing;
   b) a lubricant supply container connected with said housing;
   c) a plunger disposed within said lubricant supply container;
   d) a telescopic hollow spindle having a lubricant passage channel with a first end coupled to said housing and a second end coupled to said plunger, wherein said second end has a passage opening for allowing lubricant to flow;
   e) at least one check valve disposed within said lubricant passage channel on an inlet side; and
   f) an electro-mechanical servo drive disposed within said housing for changing a length of said telescopic hollow spindle;
   wherein said telescopic hollow spindle alternately performs setting strokes of different lengths, increasing and reducing a length of said telescopic hollow spindle.

2. The lubricant dispenser according to claim 1, further comprising a second check valve disposed at an outlet side of said lubricant passage channel.

3. The lubricant dispenser according to claim 1, wherein said telescopic hollow spindle comprises:
   a tube arranged fixed in said housing;
   an outer hollow spindle disposed around said tube;
   an outer thread slidably mounted on said tube;
   wherein said dispenser further comprises a driving gear having an inside thread that is arranged on said outer hollow spindle and rotatably supported with axial strength in said housing; and
   wherein said servo drive further comprises a pinion for driving said driving gear.

4. The lubricant dispenser according to claim 3, further comprising a plurality of seals disposed between said tube and said outer hollow spindle.

5. The lubricant dispenser according to claim 4 wherein said servo-drive comprises a motor, and a control which alternately rotates said pinion in the right and left directions of rotation.

6. The lubricant dispenser according to claim 5, wherein said servo-drive comprises an electronic control with a measured-value sensor counting a number of revolutions of said pinion directly or indirectly driven by said motor, whereby said motor is stopped after a preset number of revolutions by said electronic control, and whereby different values, such values being coordinated with the setting strokes of said telescopic hollow spindle, are preset for the setting stroke increasing the length and for the setting stroke reducing the length of said telescopic hollow spindle.

7. The lubricant dispenser as in claim 6, wherein said plunger comprises a pin located on an underside of said plunger, and wherein said outer hollow spindle has an end on said plunger side being axially movably pushed onto said pin.

8. The lubricant dispenser according to claim 7, wherein a seal is disposed between said pin and said telescopic hollow spindle.

9. The lubricant dispenser as in claim 6, further comprising a collar surface disposed on said telescopic hollow spindle, wherein said collar surface impacts said plunger during said setting stroke increasing said length of said telescopic hollow spindle, and wherein said telescopic hollow spindle further comprises an extension that is axially movable through said passage opening of said plunger, said extension extending into a space of said lubricant supply container filled with lubricant.

10. The lubricant dispenser as in claim 9, wherein said plunger further comprises a short outlet tube forming said passage opening, wherein a seal is disposed between said short outlet tube and said telescopic hollow spindle.

11. The lubricant dispenser as in claim 10, wherein said telescopic hollow spindle projects from an outside face on said housing and wherein said lubricant supply container connects to said housing in a detachable manner.

12. The lubricant dispenser as in claim 1, wherein said plunger is supported in said lubricant supply container via frictional and torsional strength, and wherein said plunger does not carry out any resetting movements.

13. The lubricant dispenser as in claim 1, wherein said servo-drive receives a return pulse from said electronic control when said plunger impacts a face of said lubricant supply container and drives said telescopic hollow spindle back into a starting position.

* * * * *